United States Patent
Walczak

(10) Patent No.: US 6,663,451 B1
(45) Date of Patent: Dec. 16, 2003

(54) SIPHON PUMP FOR A MARINE PROPULSION DEVICE

(75) Inventor: Thomas J. Walczak, Oconomowoc, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 10/189,717

(22) Filed: Jul. 3, 2002

(51) Int. Cl.[7] .............................................. B63H 21/38
(52) U.S. Cl. ................ 440/89 R; 440/88 G; 440/88 R; 114/183 R
(58) Field of Search .................. 114/183 R, 55.51; 440/88 G, 88 R, 89 R, 39

(56) References Cited

U.S. PATENT DOCUMENTS

| | | | |
|---|---|---|---|
| 4,007,804 A | 2/1977 | Hardison et al. | 181/118 |
| 4,163,366 A | 8/1979 | Kent | 60/226 |
| 4,183,338 A | 1/1980 | Lindberg | 123/119 |
| 4,668,199 A | 5/1987 | Freund et al. | 440/89 |
| 4,787,328 A * | 11/1988 | Inoue | 114/183 R |
| 4,831,822 A * | 5/1989 | Yoshimura | 440/89 C |
| 4,836,152 A | 6/1989 | Riese | 123/65 |
| 4,850,908 A * | 7/1989 | Nakase et al. | 440/39 |
| 4,983,135 A * | 1/1991 | Boda et al. | 440/88 R |
| 5,041,036 A | 8/1991 | Clark et al. | 440/89 |
| 5,334,063 A * | 8/1994 | Inoue et al. | 440/88 R |
| 5,366,397 A * | 11/1994 | Suganuma et al. | 440/39 |
| 5,628,269 A * | 5/1997 | Henmi et al. | 114/183 R |
| 5,927,338 A | 7/1999 | Boticki et al. | 137/888 |
| 6,406,344 B1 * | 6/2002 | Bland et al. | 440/88 R |

* cited by examiner

*Primary Examiner*—S. Joseph Morano
*Assistant Examiner*—Lars A. Olson
(74) *Attorney, Agent, or Firm*—William D. Lanyi

(57) ABSTRACT

A fluid draining device for an outboard motor is provided with a conduit through which exhaust gases are directed. The flow of exhaust gas through the conduit induces a lowered pressure in a central portion of the structure. The reduced pressure magnitude in the central portion of the structure causes a pressure differential in a drain tube that is sufficient to induce a flow of water through the drain tube from a region to be drained toward the central portion. The device uses the venturi effect to create the lowered pressure. The exhaust gas flow is directly through the conduit from an idle relief exhaust passage to an exhaust port from which the exhaust exits from the marine propulsion system.

17 Claims, 3 Drawing Sheets

SIPHON PUMP FOR A MARINE PROPULSION DEVICE

BACKGROUND OF THE INVENTION

1. Field of the Invention

The present invention is generally related to a siphon pump for a marine propulsion device and, more particularly, to a siphon pump that uses a venturi device to remove water from under the cowl of an outboard motor.

2. Description of the Prior Art

Outboard motors are well known to those skilled in the art. Many types of outboard motors comprise idle relief exhaust ports which are used when the engine of the outboard motor is operating at low speed, such as idle speed. The venturi effect and the Bernoulli equation are well known to those skilled in the art of fluid dynamics.

U.S. Pat. No. 4,668,199, which issued to Freund et al on May 26, 1987, discloses an idle exhaust relief system for outboard motors. The exhaust system for an outboard motor includes a main exhaust passageway extending through a partially water filled chamber in the driveshaft housing. An inlet idle relief passage connects the top of the chamber with the main exhaust passageway and an outlet passage connects the top of the chamber with the atmosphere. The system thus defines an effective exhaust silencer for the idle exhaust.

U.S. Pat. No. 4,836,152, which issued to Riese on Jun. 6, 1989, discloses an exhaust heated crankcase for a 2-cycle marine engine. The idle exhaust pressure relief system in an outboard motor is utilized to simultaneously heat the engine crankcase and other parts of the fuel supply system to prevent the puddling of fuel typically occurring at lower engine temperatures. Because the idle exhaust pressure relief is inherently operable to conduct hot exhaust gases out of the exhaust manifold only at idle or low speed operation, heat is supplied to the crankcase only at temperatures when fuel puddling typically occurs.

U.S. Pat. No. 5,041,036, which issued to Clark et al on Aug. 20, 1991, describes an idle exhaust gas relief arrangement for an outboard motor. An outboard motor comprises an internal combustion engine including a lower surface having therein an exhaust gas discharge port, a driveshaft housing having an upper end including an upper face fixed to the lower surface of the internal combustion engine, an exhaust surface extending downwardly from the upper face, an interior vertically extending main exhaust gas passage extending from the upper face and communicating with the exhaust gas discharge port, an idle exhaust gas relief passage recessed in the upper face and in spaced relation to the main exhaust gas passage, and closed by the lower surface of the internal combustion engine, and an idle exhaust gas outlet port located in the outer surface and communicating with the idle exhaust gas relief passage. It also comprises an idle exhaust gas relief tube communicating between the main exhaust gas passage and the idle exhaust gas relief passage and having a portion extending vertically within the main exhaust gas passage and terminating in spaced relation above the water level in the driveshaft housing when the driveshaft housing is located in a normal operating position and when the driveshaft housing is at rest relative to the water.

U.S. Pat. No. 4,163,366, which issued to Kent on Aug. 7, 1979, describes an apparatus for disposal of leaking fluids in a turbofan engine. The invention relates to an apparatus which harmlessly purges all fluids which leak from the fittings of a turbofan aircraft engine. Purging is achieved by passing a low speed flow of ventilating air along the exterior walls of the engine combustor section. This is accomplished by enshrouding the engine core with a cylindrical cowl. A space between the cowl and the engine combustor makes an annular shaped cavity. Ports in the cowl allow air to be brought into the cavity from the bypass ducting of the engine. The rapidly moving volume of air thus brought in vaporizes any fuel which leaks into the cavity. The vaporized air/fuel mixture is then exhausted into the hot gas plume emitted from the rear of the core engine.

U.S. Pat. No. 5,927,338, which issued to Boticki et al on Jul. 27, 1999, describes a mixing eductor. An improved mixing eductor of the type wherein the primary liquid (e.g. water) is in a main stream flowing in a downstream direction is disclosed. A venturi tube is in the eductor and has an annular sharp edge in the main stream thereby dividing such stream into a primary stream and a secondary stream around the primary stream. The eductor has an air gap and a flow guide downstream thereof. In a specific embodiment, the flow guide is annular around the venturi tube and the tube and the guide are in spaced telescoped relationship. Several embodiments of the eductor and a new method for mixing liquids are disclosed.

U.S. Pat. No. 4,183,338, which issued to Lindberg on Jan. 15, 1980, describes a combustion control system adding a liquid, exhaust gases, and PCV gases. A combustion control system adds a fluid and heat energy to the air/fuel mixture of the induction system of an internal combustion engine in response to engine need to improve combustion, to increase power, to improve efficiency, and to reduce emissions. The system incorporates fluidic control mechanisms which provide the control functions without any moving parts. The system incorporates one or more variable impedance flow control mechanisms, each of which produces an impedance to flow through the control mechanism which varies in a controlled relationship to the pressure differential across the control mechanism. The system also incorporates a variable impedance siphon break in the line connecting the liquid source with the liquid-exhaust gas acceleration chamber.

U.S. Pat. No. 4,007,804, which issued to Hardison et al on Feb. 15, 1977, describes an apparatus for removal of condensation from a marine gas exploder device. Condensate accumulating in the combustion chamber of a marine gas exploder of the cylinder and piston type is collected by gravity flow in a sump formed in a cylinder side wall or in a face of the piston, depending upon whether the cylinder is oriented horizontally or vertically. One end of an exhaust tube is positioned adjacent the base of the sump so that gaseous combustion products flow through the sump into the exhaust tube so as to collect and remove the accumulated condensate.

The patents described above are hereby expressly incorporated by reference in the description of the present invention.

SUMMARY OF THE INVENTION

A fluid draining device for an outboard motor, made in accordance with the present invention, comprises a conduit having a first end and a second end, with the first end being connectable in fluid communication with an exhaust port of an engine. The conduit has a central portion connected in fluid communication between the first and second ends. The draining device further comprises a drain tube having a first end connected in fluid communication with the central portion. A second end of the drain tube is disposed at a region of the marine propulsion system from which water is to be drained.

In a particularly preferred embodiment of the present invention, the exhaust port of the engine is an idle relief exhaust port. The region of the marine propulsion system to be drained, in a preferred embodiment, is a surface of an adapter plate of the marine propulsion system on which water can form puddles in recesses of the adapter plate. A cowl is disposed over the engine of the marine propulsion system and the central portion of the conduit is disposed under the cowl. An opening is formed through the cowl and the opening is connected in fluid communication with the second end of the conduit.

BRIEF DESCRIPTION OF THE DRAWINGS

The present invention will be more fully and completely understood from a reading of the description of the preferred embodiment of the present invention in conjunction with the drawings, in which.

DESCRIPTION OF THE PREFERRED EMBODIMENT

Figure 1:
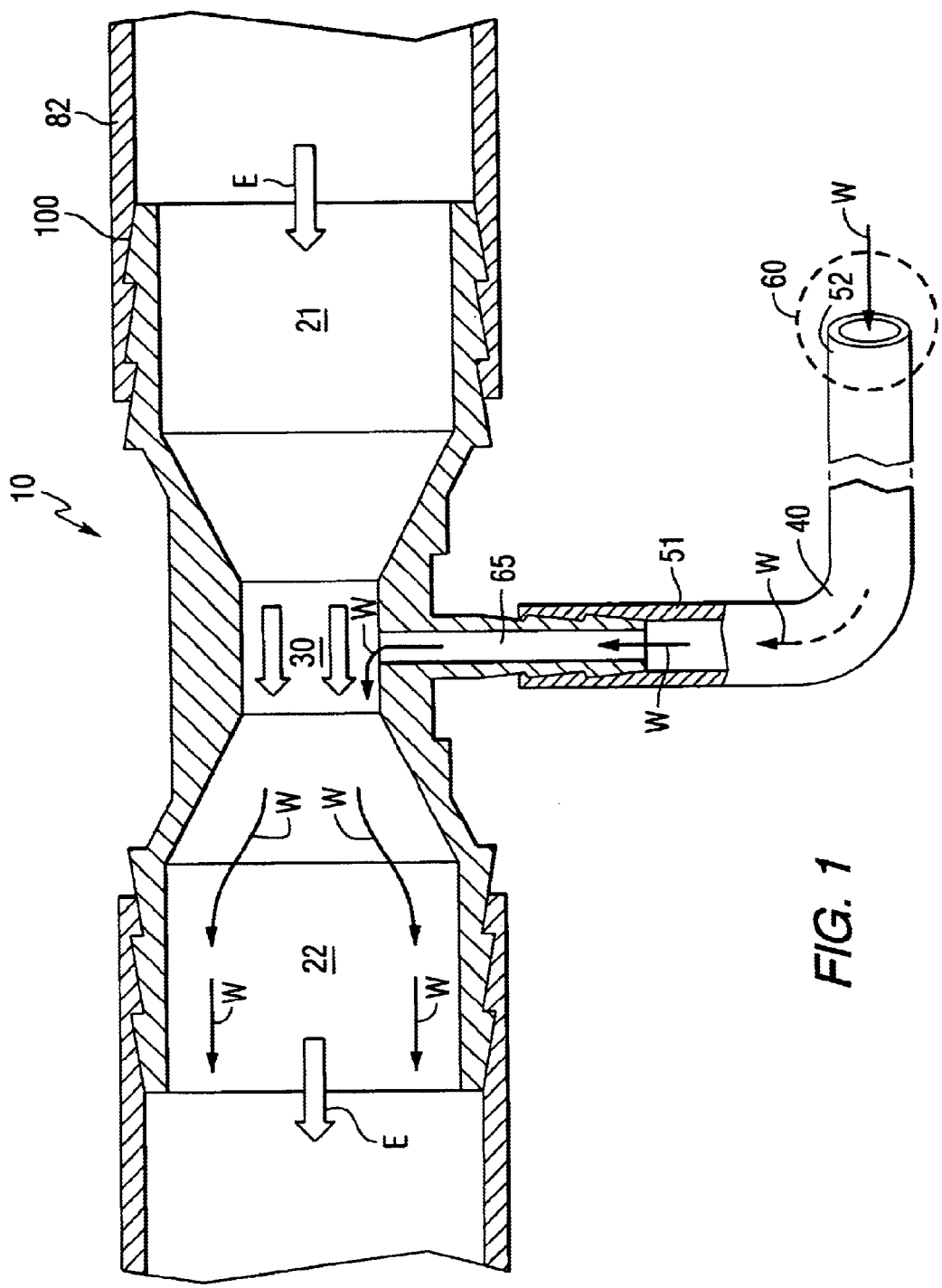
FIG. 1 a simplified representation of the present invention.

Throughout the description of the preferred embodiment of the present invention, like components will be identified by like reference numerals.

FIG. 1 shows a venturi device 10 used by the present invention. It comprises a conduit having a first end 21 and a second end 22. The first end 21 is connectable in fluid communication with an exhaust passage of an engine. The conduit has a central portion 30 that is connected in fluid communication between the first and second ends, 21 and 22. The central portion 30 has a cross sectional area that is different than the cross sectional area of the first and second ends, 21 and 22. It should be understood that the transition regions between the central portion 30 and the first and second ends, 21 and 22, can have surfaces that are curved even though the transition regions in FIG. 1 are shown with relatively straight sides that form frustums of cones.

With continued reference to FIG. 1, a drain tube 40 is provided and has a first end 51 that is connected in fluid communication with the central portion 30 of the conduit. A second end 52 of the drain tube 40 is disposed in a region 60 of a marine propulsion system from which liquid is to be drained. The region 60 is represented by a dashed circle in FIG. 1 and, in a typical application of the present invention, would be a collection location in the top surface of an adapter plate or support structure of an engine. The second end 52 of the drain tube 40 can be located in any low point which acts as a sump to collect water that exists within the engine compartment of a marine propulsion system, such as an outboard motor.

In a typical application of the present invention, the second end 52 of the drain tube 40 would be located under the cowl of the outboard motor and near a bottom portion of the engine above an adapter plate.

In a preferred embodiment of the present invention, the exhaust passage of the engine is an idle relief exhaust passage. The exhaust passage is connected in fluid communication with an exhaust manifold of the engine usually indirectly, to operate as idle exhaust relief passage through which exhaust gases flow when the engine of the outboard motor is operated at low speed.

With continued reference to FIG. 1, exhaust gases are represented by arrows E and water flow is represented by arrows W. The exhaust gases flow into the first end 21 of the conduit from which they are directed through the central portion 30. Because of the different cross sectional areas of the first end 21 and the central portion 30, a venturi effect is created. As the exhaust gases increase in velocity flowing through the central portion 30, the pressure of the exhaust gas stream in that region decreases. Opening 65 communicates that lowered pressure to the first end 51 of the drain tube 40. The exhaust gases continue to flow from the central portion 30 to the second end 22 of the conduit, as represented by arrows E. If the first end 21 and the second end 22 are of equal cross sectional areas, the pressure of the stream flowing through the conduit will generally return to its original magnitude. However, it should be clearly understood that the present invention does not require that the first and second ends, 21 and 22, have equal cross sectional areas. In order to create the lower pressure in the central portion 30, the cross sectional area of the central portion 30 is smaller than the cross sectional area of the first end 21 of the conduit.

With continued reference to FIG. 1, the lowered pressure in the central portion 30 induces an upward flow of water, as represented by arrows W, from the second end 52 of the drain tube 40 to the first end 51 and into the central portion 30. This effect drains water from the region 60 to be drained and causes that water to flow upwardly into the central portion 30 and eventually out of the second end 22 of the conduit to be discharged from the marine propulsion system with the exhaust gas stream.

Figure 2:
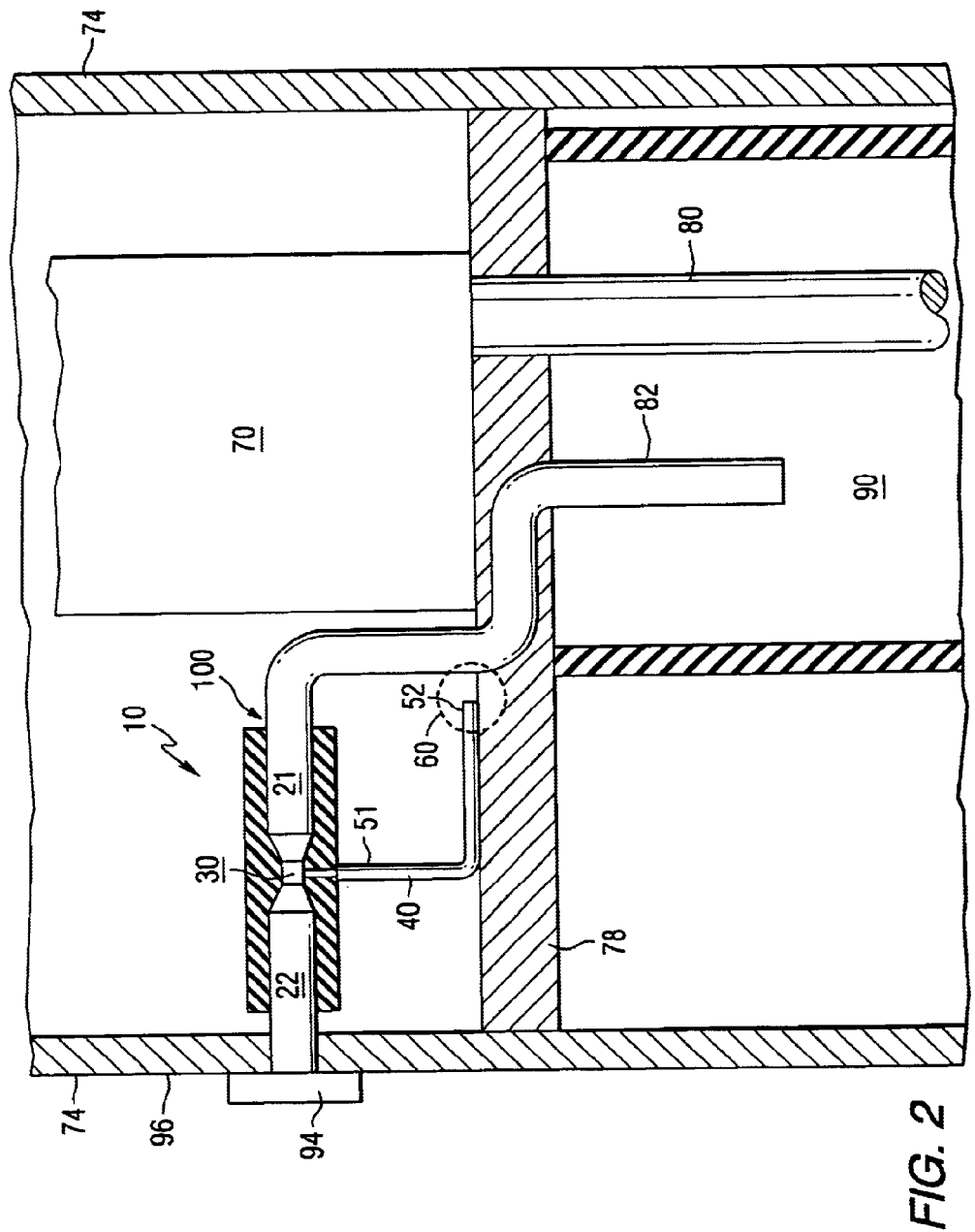
FIG. 2 shows the relative positions of the present invention, an engine, an adapter plate, a an exhaust conduit of the engine.

FIG. 2 is a highly simplified representation of an outboard motor structure with an engine 70 disposed under a cowl 74 and on an adapter plate 78. Exhaust gases are emitted from the engine 70 through a primary exhaust conduit 80. The exhaust is directed downwardly from the engine 70 through a driveshaft housing structure 82. Eventually, when the engine 70 is running at operating speeds, the exhaust gases continue to flow downwardly through the driveshaft housing 82 and a gearcase that supports a propeller. The exhaust gases are then emitted through the propeller in a typical application. The exhaust gases exit from the outboard motor at a position under the surface of the body of water in which the marine vessel is operated. This results in a silencing effect with regard to the exhaust gas flow when the engine is operating at speeds above idle speed. When the outboard motor is operated at low speeds, such as at idle speed, the relationship between the exhaust gas pressure and the level of the water is often insufficient to cause the exhaust gases to travel downwardly through the gearcase and out through the propeller structure. In these circumstances, an idle exhaust relief passage 82 provides a second exhaust passage for the exhaust gases. Typically, this exhaust passage conducts exhaust gases away from the cavity 90 and out through an idle exhaust relief conduit 94 located somewhere on the outboard motor. An idle exhaust relief conduit structure 94 is shown formed through a rear portion 96 of the cowl 74 in FIG. 2.

When the present invention is used in conjunction with an outboard motor, the idle exhaust relief passage 82 is connected to the first end 21 of the conduit within the venturi structure 10. This connection is made at the position identified by reference numeral 100 in FIG. 2. Although shown only schematically in FIG. 2, it, should be understood that this connection can typically comprise a barbed fitting to facilitate the easy installation of the present invention.

However, any other type of connection between the idle exhaust relief conduit 82 and the present invention is within the scope of the present invention. The second end 22 of the conduit is connected to the idle exhaust relief conduit structure 94 that allows the exhaust gases to pass through the rear portion 96 of the cowl 74. As the exhaust gas flows through the structure 10 of the present invention, the lower pressure in the central portion 30 induces an upward flow of water through the drain tube 40 from the region 60 to be drained of water. The water flows from the region 60 into the second end 52 of the drain tube 40 and upward into the central portion 30. Within the central portion 30, the draining water is mixed with exhaust gases and emitted through the second end 22 and out through the cowl 74 as a result of the location of the idle exhaust relief port 94 and the opening that it provides through the rear portion of a cowl 74. It should be understood that, in a typical application of the present invention, the draining system is not intended to work when the engine 70 is operated at high operating speeds. However, alternative embodiments of the present invention could incorporate exhaust passages other than the idle relief exhaust passage as a primary flow through the conduit in order to induce the low pressure in the central region 30.

Figure 3:
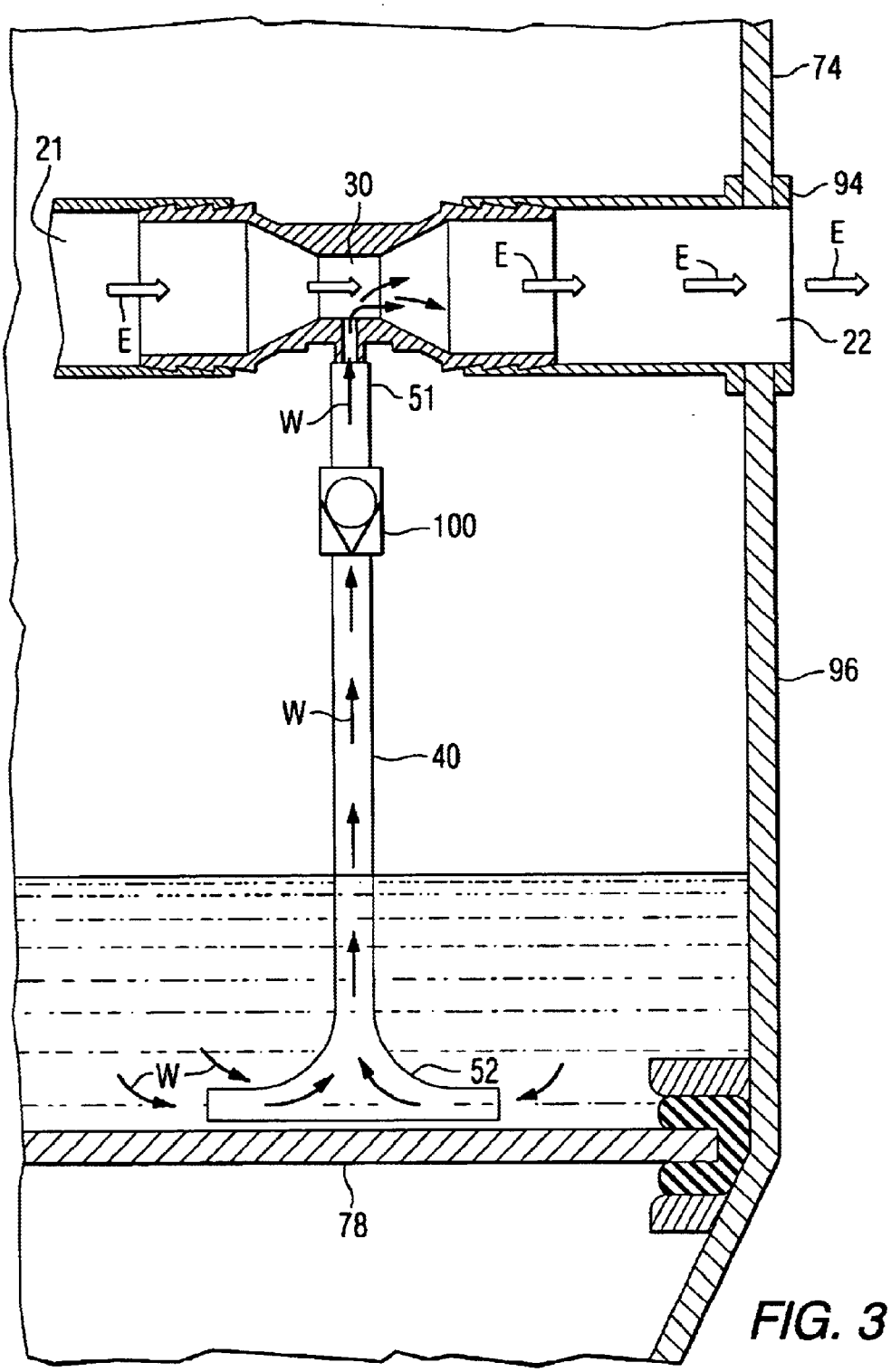
FIG. 3 shows the present invention associated with a check valve.

FIG. 3 is partial view of an outboard motor incorporating the present invention. In FIG. 3, the second end 52 of the drain tube 40 is slightly modified to allow the incorporation of a filtering screen within its structure to avoid it being plugged by debris. Also, a check valve 100 is connected in fluid communication with the drain tube 40 in order to prevent a flow of water through the second end 22 when the engine is not in operation and also to prevent a flow of exhaust gas in a downward direction toward the second end 52 of the drain tube 40. Otherwise, a partial blockage of the second end 22 of the conduit could potentially cause a downward flow of exhaust gas into the cavity under the cowl 74 and above the adapter plate 78.

The operation of the venturi structure of the present invention is generally described by the Bernoulli equation which is shown in Equation 1 below and more specifically in Equation 2.

$$\text{Pressure energy} + \text{Kinetic energy} + \text{Potential energy} = \text{Constant} \quad (1)$$

$$P_1 + \rho v_1^2/2 + gh_1 = P_2 + \rho v_2^2/2 + \rho gh_2 \quad \rho(2)$$

In Equation 2, shown above, the energy provided by the pressure the density $\rho$, the velocity v, the acceleration of gravity g, and the height h are summed together and the sum of these energies remain constant. It should be understood that the Bernoulli equation shown above is provided to describe the general relationships of the parameters relating to the flow of exhaust gases through the conduit of the present invention and is not intended for the purpose of providing specific calculations relating to those parameters. The equation shown above is stated in its simplified form and is based on several assumptions. For example, it doesn't incorporate terms relating to viscous losses, turbulence, non laminar flow, externally caused energy changes, such as the addition of heat, and other terms that would be relevant if precise calculations of velocity and pressure were required. With regard to the present invention, the only limitation to the structure 10 described above in conjunction with FIGS. 1–3 is that a region, such as the central portion 30, is provided which induces a lowered pressure sufficient to cause water to rise upwardly through the drain tube 40 into the central portion 30 or into the exhaust stream to be passed out of the engine compartment.

In one embodiment of the present invention, the venture device is configured for the purpose of lifting water upwardly approximately five inches through the drain tube 40 from the region 60 to the central portion 30. In that particular embodiment, the diameter of both the first and second ends, 21 and 22, is approximately 25 millimeters and the diameter of the central portion is approximately 10 millimeters. These dimensions are based on an assumed exhaust mass flow rate of approximately 3.6 grams per second and a velocity through the first and second ends, 21 and 22, of approximately 8.38 meters per second. This results in a velocity through the central portion 30 of approximately 51.98 meters per second. The pressure drop caused by the venture effect is sufficient to raise the water from the region 60 to the central region 30 of the venture device 10 and drain the residual water from region 60. However, it should be clearly understood that the dimensions of the venture device 10 and its position relative to region 60 are not limiting to the scope of the present invention.

Although the present invention has been described in particular detail and illustrated to show a preferred embodiment, it should be understood that alternative embodiments are also within its scope.

I claim:

1. A fluid draining device for an marine propulsion system, comprising:
   a conduit having a first end and a second end, said first end being connectable in fluid communication with an exhaust passage of an engine to direct exhaust gasses away from said engine, said conduit having a central portion connected in fluid communication between said first and second ends, said central portion having a cross sectional area that is different than said first and second ends, said central portion of said conduit being a venturi structure; and
   a drain tube having a first end connected in fluid communication with said central portion, a second end of said drain tube being disposed at a region of said marine propulsion system from which a liquid is to be drained said liquid being induced to flow through said drain tube in response to said exhaust gasses flowing through said venturi structure.

2. The device of claim 1, wherein:
   said exhaust passage is an idle relief exhaust passage.

3. The device of claim 1, further comprising:
   said engine, said exhaust passage being connected in fluid communication with an exhaust manifold of said engine.

4. The device of claim 1, wherein:
   said region of said marine propulsion system to be drained is on an engine support structure of said marine propulsion system.

5. The device of claim 1, further comprising:
   a cowl disposed over said engine of said marine propulsion system, said venturi structure being disposed under said cowl.

6. The device of claim 5, further comprising:
   an opening formed through said cowl, said opening being connected in fluid communication with said second end of said conduit.

7. The device of claim 1, wherein:
   said marine propulsion system is an outboard motor.

8. The device of claim 1, wherein:
   said first and second ends of said conduit and said central portion of said conduit are shaped to cause a lower pressure in said central portion than in said first and second ends when a fluid flows from said first end to said second end.

9. A fluid draining device for a marine propulsion system, comprising:

a conduit having a first end which is connectable in fluid communication with an exhaust passage to direct exhaust gasses away from an engine of said marine propulsion system;

a venturi structure connected in fluid communication with said first end of said conduit;

a second end of said conduit connected in fluid communication with said venturi structure, with said venturi structure being connected in fluid communication between said first and second ends of said conduit; and a drain tube having a first end connected in fluid communication with said venturi structure, a second end of said drain tube being disposed at a region of said marine propulsion from which a liquid is to be drained, said region of said marine propulsion system to be drained is a support structure on which said engine is disposed, said liquid being induced to flow through said drain tube in response to a flow of said exhaust gasses through said venturi structure.

10. The device of claim 9, wherein:

said marine propulsion system is an outboard motor.

11. The device of claim 10, wherein:

said exhaust passage is an idle relief exhaust passage.

12. The device of claim 11, further comprising:

said engine, said exhaust passage being connected in fluid communication with an exhaust manifold of said engine.

13. The device of claim 9, further comprising:

a cowl disposed over an said engine of said marine propulsion system, said venturi structure being disposed under said cowl; and an opening formed through said cowl, said opening being connected in fluid communication with said second end of said conduit.

14. A fluid draining device for a marine propulsion system, comprising:

a conduit having a first end which is connectable in fluid communication with an idle exhaust relief passage of an engine through which exhaust gasses are conducted away from said engine;

a venturi structure connected in fluid communication with said first end of said conduit;

a second end of said conduit connected in fluid communication with said venturi structure, with said venturi structure being connected in fluid communication between said first and second ends of said conduit; and a drain tube having a first end connected in fluid communication with said venturi structure, a second end of said drain tube being disposed at a region of said marine propulsion from which a liquid is to be drained, wherein said region of said marine propulsion system to be drained is on a support plate of said engine.

15. The device of claim 14, wherein:

said marine propulsion system is an outboard motor.

16. The device of claim 15, wherein:

said idle relief passage is connected in fluid communication with an exhaust manifold of said engine.

17. The device of claim 14, further comprising:

a cowl disposed over said engine of said marine propulsion system, said venturi structure being disposed under said cowl; and an opening formed through said cowl, said opening being connected in fluid communication with said second end of said conduit.

* * * * *